(12) United States Patent
Zhao et al.

(10) Patent No.: US 12,392,609 B2
(45) Date of Patent: Aug. 19, 2025

(54) METHODS FOR REAL-TIME DEVIATION MONITORING OF MINIATURE PIPE ROOFING JACKING PIPE OF SPIRAL SOIL-DISCHARGING

(71) Applicants: TIANJIN PORT ENGINEERING INSTITUTE CO., LTD. OF CCCC FIRST HARBOR ENGINEERING CO., LTD., Tianjin (CN); CCCC FIRST HARBOR ENGINEERING CO., LTD., Tianjin (CN); TIANJIN PORT ENGINEERING QUALITY TESTING CENTER CO., LTD., Tianjin (CN)

(72) Inventors: Yifei Zhao, Tianjin (CN); Xiaoyan Zhang, Tianjin (CN); Jinfang Hou, Tianjin (CN); Zhuocheng Li, Tianjin (CN); Binlei Wang, Tianjin (CN)

(73) Assignees: TIANJIN PORT ENGINEERING INSTITUTE CO., LTD. OF CCCC FIRST HARBOR ENGINEERING CO., LTD., Tianjin (CN); CCCC FIRST HARBOR ENGINEERING CO., LTD., Tianjin (CN); TIANJIN PORT ENGINEERING QUALITY TESTING CENTER CO., LTD., Tianjin (CN)

( * ) Notice: Subject to any disclaimer, the term of this patent is extended or adjusted under 35 U.S.C. 154(b) by 0 days.

(21) Appl. No.: 19/096,703

(22) Filed: Mar. 31, 2025

(65) Prior Publication Data

US 2025/0231026 A1    Jul. 17, 2025

Related U.S. Application Data

(63) Continuation of application No. PCT/CN2024/103854, filed on Jul. 5, 2024.

(30) Foreign Application Priority Data

Aug. 15, 2023    (CN) .......................... 202311021389.3

(51) Int. Cl.
*G01C 15/00*    (2006.01)
*E21D 9/00*    (2006.01)
*E21D 9/06*    (2006.01)

(52) U.S. Cl.
CPC ........... *G01C 15/004* (2013.01); *E21D 9/001* (2013.01); *E21D 9/0621* (2013.01); *E21D 9/0642* (2016.01); *E21D 9/004* (2013.01)

(58) Field of Classification Search
CPC ..... G01C 15/004; E21D 9/001; E21D 9/0621; E21D 9/0642; E21D 9/004
See application file for complete search history.

(56) References Cited

U.S. PATENT DOCUMENTS 3,708,984 A * 1/1973 Coleman ................ E21D 9/005
                                                    405/184
3,768,267 A * 10/1973 Chlumecky ............ E21D 11/05
                                                    405/152

(Continued)

FOREIGN PATENT DOCUMENTS

CN    216516508 U  *  5/2002
CN    2601390 Y      1/2004

(Continued)

OTHER PUBLICATIONS

First Office Action in Chinese Application No. 202311021389.3 mailed on Sep. 18, 2023, 13 pages.

(Continued)

*Primary Examiner* — Yaritza Guadalupe-McCall
(74) *Attorney, Agent, or Firm* — Metis IP LLC

(57) ABSTRACT

Provide is a method for real-time deviation monitoring of miniature pipe-roofing jacking pipes of spiral soil-discharg- (Continued)

ing. The method includes: welding a measurement auxiliary pipe to an outer wall of a pipe-roofing steel pipe, providing a laser pen inside a front end of the measurement auxiliary pipe, and the laser pen emits a beam propagating from the front end to a rear end of the measurement auxiliary pipe. After installation, a male lock buckle and a female lock buckle are symmetrically welded onto the pipe-roofing steel pipe, and form an integrated structure with the pipe-roofing steel pipe. A measurement plate is fixedly mounted on a housing of a pipe-roofing drilling machine. During jacking, a change of a position of the beam on the measurement plate is observed to determine a deviation of a drill bit of the pipe-roofing drilling machine and the pipe-roofing steel pipe in real-time.

6 Claims, 7 Drawing Sheets

(56) References Cited

U.S. PATENT DOCUMENTS

| | | | | |
|---|---|---|---|---|
| 5,813,482 A | * | 9/1998 | Barbera | E21D 9/108 |
| | | | | 175/73 |
| 6,652,190 B1 | * | 11/2003 | Verkyk | E21D 9/005 |
| | | | | 405/145 |

FOREIGN PATENT DOCUMENTS

| | | | | | |
|---|---|---|---|---|---|
| CN | 201795799 U | | 4/2011 | | |
| CN | 102296858 B | * | 12/2012 | | |
| CN | 104142145 A | | 11/2014 | | |
| CN | 105350971 A | | 2/2016 | | |
| CN | 105927230 A | * | 9/2016 | | |
| CN | 108612118 A | * | 10/2018 | | |
| CN | 109029300 A | | 12/2018 | | |
| CN | 109268015 A | | 1/2019 | | |
| CN | 109916381 A | | 6/2019 | | |
| CN | 209353342 U | | 9/2019 | | |
| CN | 110344842 A | | 10/2019 | | |
| CN | 111485892 A | | 8/2020 | | |
| CN | 212300315 U | | 1/2021 | | |
| CN | 112323772 A | * | 2/2021 | | |
| CN | 212898508 U | | 4/2021 | | |
| CN | 214997645 U | | 12/2021 | | |
| CN | 114739358 A | * | 7/2022 | ............. | G01C 15/00 |
| CN | 114934473 A | * | 8/2022 | ............... | B63C 7/16 |
| CN | 217204969 U | * | 8/2022 | | |
| CN | 217538696 U | * | 10/2022 | | |
| CN | 219034719 U | | 5/2023 | | |
| CN | 116335679 A | | 6/2023 | | |
| CN | 116734816 A | | 9/2023 | | |
| CN | 220649297 U | * | 3/2024 | | |
| CN | 118917785 A | * | 11/2024 | | |
| CN | 119062344 A | * | 12/2024 | | |
| JP | H0932481 A | | 2/1997 | | |
| JP | 2003343190 A | * | 12/2003 | | |
| JP | 2022525542 A | * | 5/2022 | | |
| KR | 20050011375 A | | 1/2005 | | |
| WO | WO-2020190196 A1 | * | 9/2020 | ............. | E21B 19/08 |
| WO | WO-2025036007 A1 | * | 2/2025 | ............. | E21D 9/001 |

OTHER PUBLICATIONS

Decision to Grant a Patent in Chinese Application No. 202311021389.3 mailed on Sep. 24, 2023, 5 pages.

Xin, Zhenggang, Experimental study on attitude-interlock control technology of pipe-curtain group with inner interlock joints, Tunnel Construction, 40(1): 43-49, 2020.

International Search Report in PCT/CN2024/103854 mailed on Oct. 15, 2024, 8 pages.

Written Opinion in PCT/CN2024/103854 mailed on Oct. 15, 2024, 7 pages.

* cited by examiner

METHODS FOR REAL-TIME DEVIATION MONITORING OF MINIATURE PIPE ROOFING JACKING PIPE OF SPIRAL SOIL-DISCHARGING

CROSS-REFERENCE TO RELATED APPLICATIONS

This application is a continuation of International Application No. PCT/CN2024/103854, filed on Jul. 5, 2024, which claims priority to Chinese patent Application No. 202311021389.3, filed on Aug. 15, 2023, the entire contents of each of which are incorporated herein by reference.

TECHNICAL FIELD

The present disclosure relates to the technical field of the construction of pipe-roofing jacking pipes, and in particular, to a method for real-time deviation monitoring of miniature pipe-roofing jacking pipes of spiral soil-discharging.

BACKGROUND

A pipe-roofing manner is an advanced support technique before the concealed excavation of an underground tunnel. The pipe-roofing manner includes jacking densely arranged pipe-roofing steel pipes to form an advanced support system, wherein the pipes are interconnected via locking couplers to create a sealed pipe roof, which not only enhances an overall support strength but also provides effective water sealing. Depending on a diameter of the pipe-roofing steel pipes and a geological condition, common pipe-roofing construction approaches include a slurry balance pipe jacking technique, an earth pressure balance pipe jacking technique, and a spiral soil-discharging micro pipe jacking technique. For pipe-roofing steel pipes with a relatively small diameter, the screw conveyor micro pipe jacking technique is typically used. During large-diameter pipe jacking of a pipe-roofing steel pipe with a relatively large diameter, a measurement target and an imaging device are usually installed at a rear end of a jacking machine head. A light source positioned at a pipe opening at a front end of the pipe-roofing steel pipe emits a beam projected onto the measurement target, and a relative position between the beam and a center point of the measurement target is observed via the imaging device to determine a deviation during the pipe-jacking process. This measurement manner is feasible only when the pipe has a sufficient internal space to accommodate the measurement target and imaging device, allowing the beam to enter into the pipe from the pipe opening.

However, if the spiral soil-discharging micro pipe jacking technique is used for a pipe-roofing steel pipe with a relatively small diameter, since the diameter of the pipe is already small, and the internal space of the pipe is almost completely occupied by a spiral drill rod, which makes it impossible to install a relevant measuring device and achieve real-time measurement during jacking. Currently, the spiral soil-discharging micro pipe jacking technique typically requires disassembly of a jacking device and withdrawal of the spiral drill rod before a measurement can be taken. Alternatively, a water level may be measured to observe an elevation deviation of the pipe, but this approach fails to capture horizontal (left-right) deviation data. Due to pipe diameter and construction process limitations, existing manner cannot achieve real-time measurement during jacking, posing significant challenges to timely deviation correction and attitude adjustment during pipe-roofing steel pipe jacking.

SUMMARY

The purpose of the present disclosure is to provide a method for real-time deviation monitoring of miniature pipe-roofing jacking pipes of spiral soil-discharging. The method is provided to address the issue in existing technologies where real-time measurement during jacking may not be achieved in the spiral soil-discharging micro pipe jacking technique, and also enables real-time monitoring of a displacement of a jacked pipe-roofing steel pipe.

To achieve the above objective, the technical solution provided in the present disclosure includes the following operations:

One or more embodiments of the present disclosure provide a method for real-time deviation monitoring of miniature pipe-roofing jacking pipes of spiral soil-discharging. The method may include the following operations:

Operation 1, welding a measurement auxiliary pipe to an outer wall of a pipe-roofing steel pipe. A laser pen is installed inside a front end of the measurement auxiliary pipe, a beam emitted by the laser pen is parallel to an axial direction of the measurement auxiliary pipe, and the beam propagates from the front end of the measurement auxiliary pipe to a rear end of the measurement auxiliary pipe along an interior of the measurement auxiliary pipe.

After the measurement auxiliary pipe is installed, a male lock buckle and a female lock buckle of the pipe-roofing steel pipe are symmetrically welded with respect to an axis formed by a line connecting a center of the measurement auxiliary pipe and a center of the pipe-roofing steel pipe, such that the male lock buckle and the female lock buckle form an integrated structure with the pipe-roofing steel pipe.

Operation 2, fixing a pipe-roofing drilling machine at a first preset position, and sleeving the pipe-roofing steel pipe equipped with the measurement auxiliary pipe, the male lock buckle, and female lock buckle from operation 1 onto a spiral drill rod of the pipe-roofing drilling machine.

Operation 3, after the pipe-roofing steel pipe is installed, fixing a measurement plate onto a housing of the pipe-roofing drilling machine, and aligning a center point of the measurement plate with the beam emitted by the laser pen.

Operation 4, during a jacking procedure of the pipe-roofing steel pipe, observing a change of a position of the beam on the measurement plate to monitor a deviation of a drill bit of the pipe-roofing drilling machine and the pipe-roofing steel pipe in real-time.

Operation 5, after completing the jacking procedure of a previous pipe-roofing steel pipe, moving the pipe-roofing drilling machine to a second preset position for a next pipe-roofing steel pipe, and repeating operation 2. Installing two measurement plates on two sides of a main body of the pipe-roofing drilling machine, centered on a beam on the previous pipe-roofing steel pipe and a beam on the next pipe-roofing steel pipe, respectively, such that the beam on the previous pipe-roofing steel pipe and the beam on the next pipe-roofing steel pipe are directed toward center points of the two measurement plates, respectively, thus during the jacking procedure of the next pipe-roofing steel pipe, a deviation of the next pipe-roofing steel pipe is measured in real-time, and a deviation of the previous pipe-roofing steel pipe that has been jacked is monitored simultaneously.

Operation 6: repeating operation 5 until a last pipe-roofing steel pipe is fully jacked.

In some embodiments, the measurement auxiliary pipe is a steel pipe.

In some embodiments, a diameter of the measurement auxiliary pipe is in a range of 4 cm-8 cm.

In some embodiments, a central axis of the measurement auxiliary pipe is parallel to a central axis of the pipe-roofing steel pipe.

In some embodiments, the front end of the measurement auxiliary pipe is shaped into a conical head to reduce soil resistance during jacking.

In some embodiments, the male lock buckle includes two outwardly bent L-shaped steel plates, and the female lock buckle includes two inwardly bent L-shaped steel plates.

In some embodiments, in operation 2, a posture of the pipe-roofing steel pipe is adjusted to ensure that a position and a slope of the pipe-roofing steel pipe meet a requirement, and a thrust ring spacer is installed between a jacking device of the pipe-roofing drilling machine and the pipe-roofing steel pipe.

Beneficial effects of the present disclosure as compared with the existing technologies include:

(1) By arranging the measurement auxiliary pipe on the outer wall of the pipe-roofing steel pipe, the present disclosure resolves the challenge of real-time measurement from inside the pipe during spiral soil-discharging micro pipe-roofing construction. Moreover, the male lock buckle and the female lock buckle of the pipe-roofing steel pipe are symmetrically welded with respect to the axis connecting the centers of the measurement auxiliary pipe and the pipe-roofing steel pipe, thereby ensuring easy fabrication and installation, low cost, and no interference with the normal jacking of the pipe-roofing steel pipe or the connection between adjacent pipes.

(2) The measurement process of the present disclosure does not require an imaging device or other auxiliary instruments, allowing an operator to visually observe the deviation of the pipe during jacking.

(3) The present disclosure not only measures the deviation of the previous pipe-roofing steel pipe in real-time, but also monitors the deviation of the jacked pipe-roofing steel pipe.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

Figure 4:
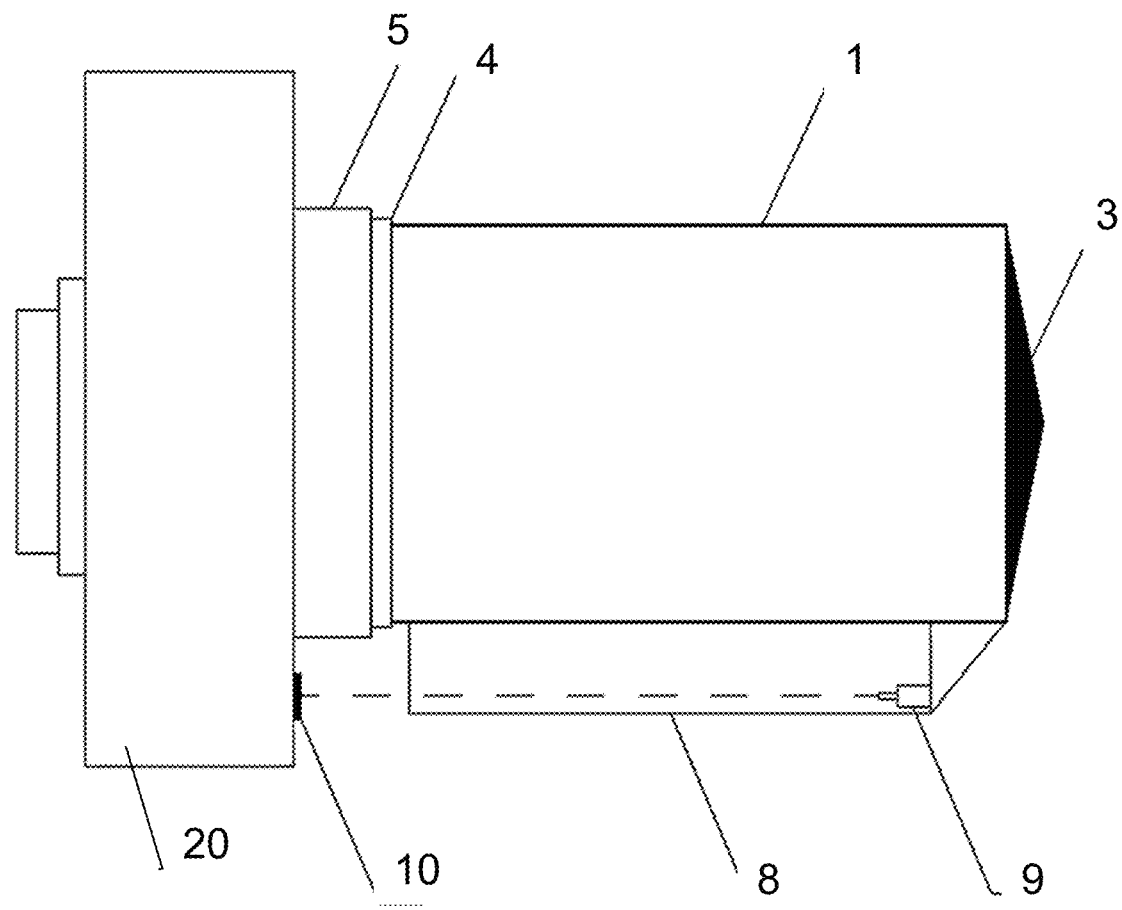
FIG. 4 is a top view illustrating the measurement of a previous pipe-roofing steel pipe during jacking according to some embodiments of the present disclosure.
Figure 6:
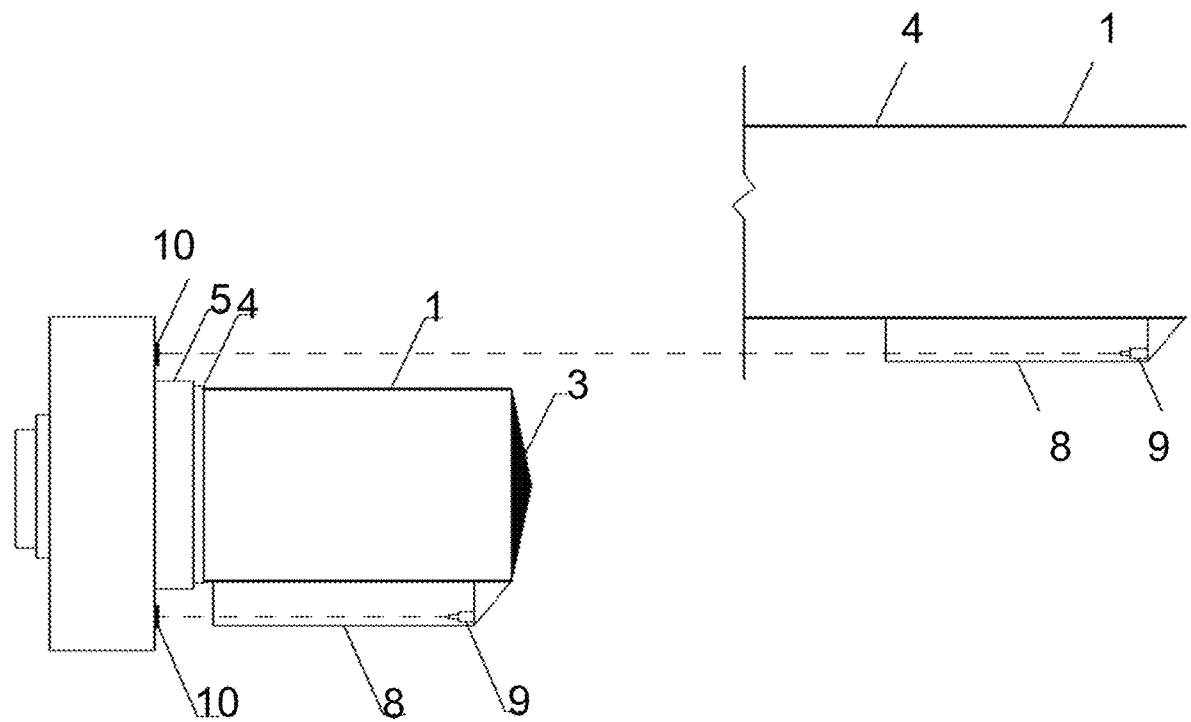
FIG. 6 is a top view illustrating the monitoring and measurement of a previous pipe-roofing steel pipe and a next pipe-roofing steel pipe according to some embodiments of the present disclosure.

To better illustrate the principle of measurement and monitoring in the present disclosure and to clearly show a position of a beam, the male lock buckle and female lock buckle of the pipe-roofing steel pipe are not shown in FIG. 4 and FIG. 6.

For those skilled in the art, other relevant accompanying drawings may be obtained based on the above accompanying drawings without creative labor.

DETAILED DESCRIPTION

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

A pipe-roofing manner is a commonly used underground construction manner. The pipe-roofing manner includes densely arranging a plurality of pipe-roofing steel pipes to form a water-sealing and collapse-resistant support structure underground, thereby providing a secure environment for internal construction. During a construction process, a pipe-roofing drilling machine continuously jacks forward to lay the pipe-roofing steel pipes, forming a continuous underground working space along a construction direction. In some embodiments, the pipe-roofing steel pipe is also referred to as the pipe-roofing jacking pipe.

To minimize errors during the jacking and laying of pipe-roofing steel pipes, reduce gaps between adjacent pipes, and thereby prevent the intrusion of slurry, groundwater, and other contaminants into the underground working space—as well as to ensure alignment between the construction direction and a preset trajectory—it is necessary to accurately and promptly monitor deviations of the pipe-roofing steel pipes in real-time.

Some embodiments of the present disclosure provide a method for real-time deviation monitoring of miniature pipe-roofing jacking pipes of spiral soil-discharging. Referring to FIG. 1-FIG. 7, the method includes the following operations:

Operation 1, welding a measurement auxiliary pipe to an outer wall of the pipe-roofing steel pipe, such that a central axis of the measurement auxiliary pipe is parallel to a central axis of the pipe-roofing steel pipe. A laser pen 9 is provided inside a front end of the measurement auxiliary pipe 8, the laser pen 9 emits a beam parallel to an axial direction of the measurement auxiliary pipe 8, and the beam propagates from the front end of the measurement auxiliary pipe 8 to a rear end of the measurement auxiliary pipe 8 along an interior of the measurement auxiliary pipe 8. After installation of the measurement auxiliary pipe 8 is completed, a male lock buckle 7 and a female lock buckle 6 of the pipe-roofing steel pipe 1 are symmetrically welded with respect to an axis formed by a line connecting a center of the measurement auxiliary pipe 8 and a center of the pipe-roofing steel pipe 1, such that the male lock buckle 7 and the female lock buckle 6 form an integrated structure with the pipe-roofing steel pipe 1.

The pipe-roofing steel pipe 1 refers to a pipe configured to build a support structure in a pipe-roofing construction manner. In some embodiments, the pipe-roofing steel pipe 1 is a hollow steel pipe.

The measurement auxiliary pipe 8 refers to an auxiliary pipe that determines the deviation of the pipe-roofing steel pipe 1 during jacking. In some embodiments, the measurement auxiliary pipe 8 is a steel pipe.

In some embodiments of the present disclosure, by setting the measurement auxiliary pipe 8 as a steel pipe, a deformation resistance of the measurement auxiliary pipe 8 during jacking construction can be ensured, thereby guaranteeing an accuracy of real-time deviation monitoring.

In some embodiments, a diameter of the measurement auxiliary pipe 8 is in a range of 4 cm-8 cm.

In some embodiments, the diameter of the measurement auxiliary pipe 8 may also be one of 4 cm, 5 cm, 6 cm, 7 cm, and 8 cm.

In some embodiments of the present disclosure, by setting the diameter of the measurement auxiliary pipe in the range of 4 cm-8 cm, it is possible to ensure that the measurement auxiliary pipe can accommodate components such as the laser pen, and reduce difficulties in welding and installation caused by an excessively large size of the measurement auxiliary pipe, thereby improving construction efficiency.

Figure 2:
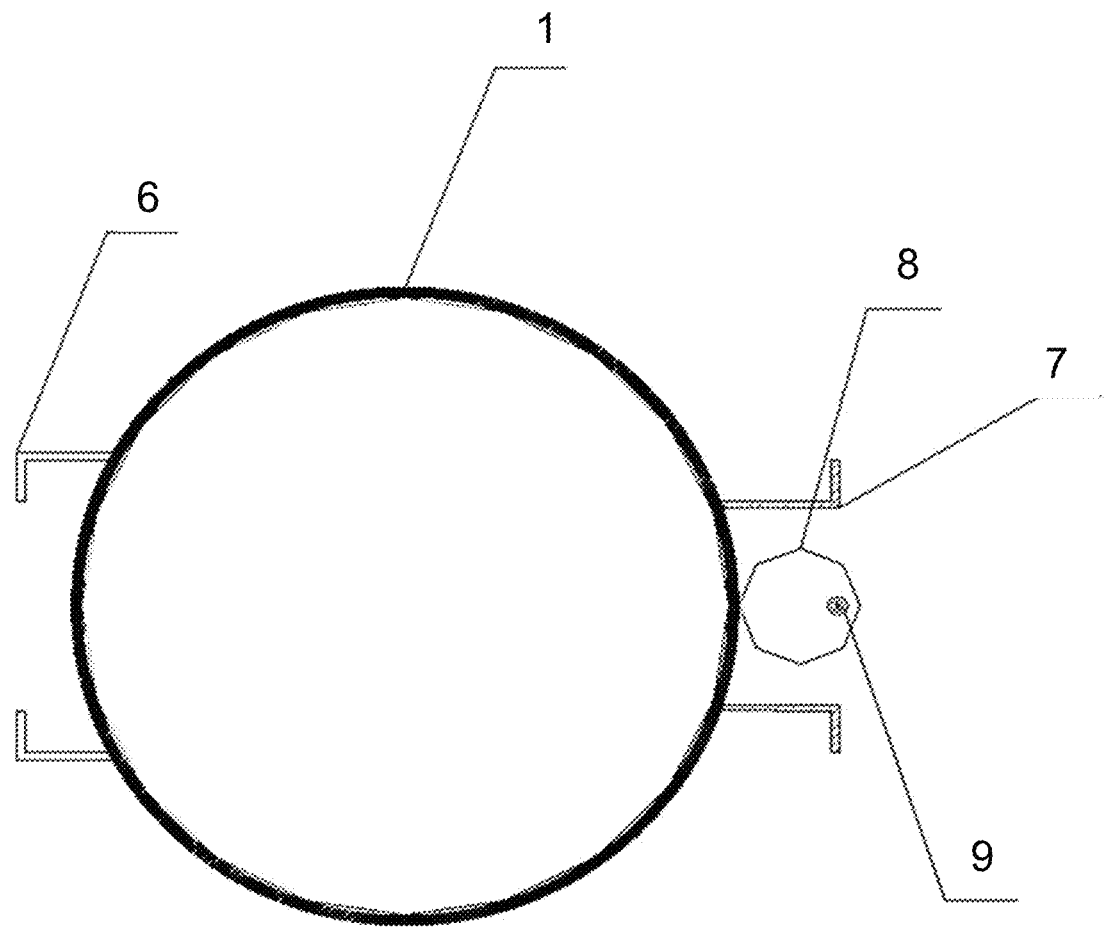
FIG. 2 is a front view of a pipe-roofing steel pipe installed with a measurement auxiliary pipe, a male lock buckle, and a female lock buckle, according to some embodiments according to the present disclosure.

FIG. 2 is a front view of a pipe-roofing steel pipe installed with a measurement auxiliary pipe, a male lock buckle, and a female lock buckle, according to some embodiments according to this disclosure. As shown in FIG. 2, a front end (i.e. the bottom end) of the measurement auxiliary pipe 8 is a conical head. The front end (i.e. a bottom end) of the measurement auxiliary pipe 8 is configured as a closed structure with a conical head, and a rear end of the measurement auxiliary pipe 8 may retain an original pipe opening.

The front end refers to an end of the measurement auxiliary pipe 8 that advances in a jacking direction during construction, i.e., an end of the measurement auxiliary pipe 8 that is farther from a pipe-roofing drilling machine. The rear end refers to an end of the measurement auxiliary pipe 8 that is near the pipe-roofing drilling machine.

In some embodiments, parameters such as a cone angle of the conical head, a length of the conical head, and a cone curvature may be determined based on actual application scenarios and needs.

In some embodiments of the present disclosure, by configuring the front end of the measurement auxiliary pipe 8 as the conical head, a resistance exerted by the soil on the measurement auxiliary pipe 8 during jacking can be reduced.

Figure 3:
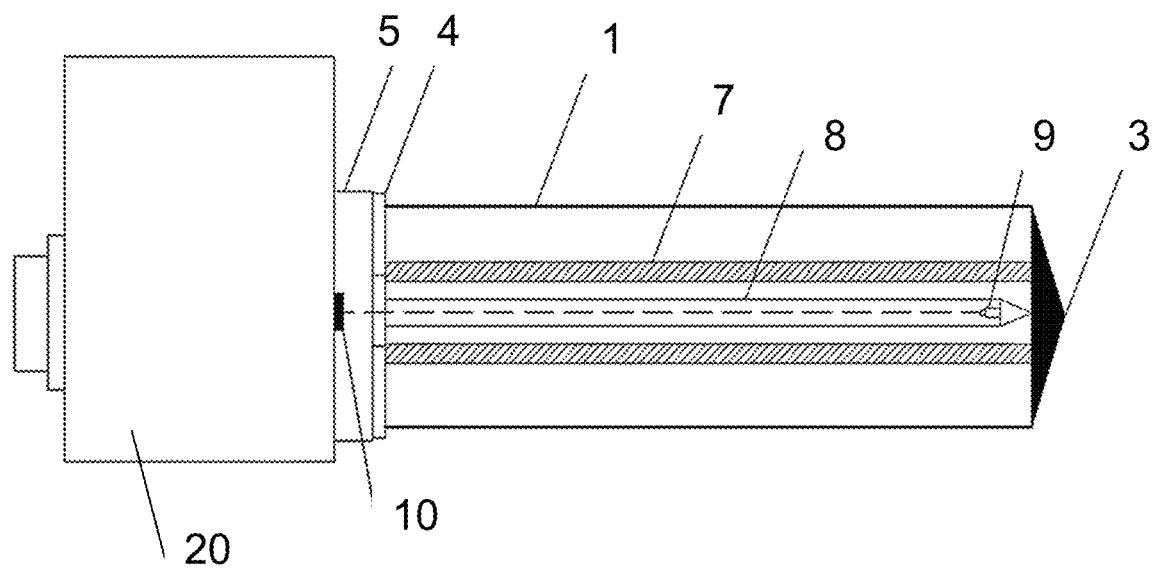
FIG. 3 is a side view illustrating the measurement of a previous pipe-roofing steel pipe during jacking according to some embodiments of the present disclosure.

FIG. 3 is a side view illustrating the measurement of a previous pipe-roofing steel pipe during jacking according to some embodiments of the present disclosure. FIG. 4 is a top view illustrating the measurement of a previous pipe-roofing steel pipe during jacking according to some embodiments of the present disclosure. As shown in FIG. 3 and FIG. 4, a laser pen 9 is installed inside a front end of the measurement auxiliary pipe 8, a beam emitted by the laser pen 9 is parallel to an axial direction of the measurement auxiliary pipe 8, and the beam propagates from a front end of the measurement auxiliary pipe 8 to a rear end of the measurement auxiliary pipe 8 along an interior of the measurement auxiliary pipe 8.

In some embodiments, the measurement auxiliary pipe 8 may be welded and secured to an outer wall of the pipe-roofing steel pipe 1, such that a central axis of the measurement auxiliary pipe 8 is parallel to a central axis of the pipe-roofing steel pipe 1 after welding.

In some embodiments, after the measurement auxiliary pipe 8 is installed, the male lock buckle 7 and the female lock buckle 6 of the pipe-roofing steel pipe 1 are symmetrically welded with respect to an axis formed by a line connecting a center of the measurement auxiliary pipe 8 and a center of the pipe-roofing steel pipe 1, such that the male lock buckle 7 and the female lock buckle 6 form an integrated structure with the pipe-roofing steel pipe 1, as shown in FIG. 2.

The male lock buckle 7 and the female lock buckle 6 are fasteners used to connect adjacent pipe-roofing steel pipes 1. The male lock buckle 7 and the female lock buckle 6 are designed with matching dimensions and shapes to ensure proper interlocking 1.

In some embodiments, a position, a shape, a material, and a size of each of the male lock buckle 7 and the female lock buckle 6 on the pipe-roofing steel pipe 1 may be determined according to actual application scenarios and needs. For example, the shape of the male lock buckle 7 and the shape of the female lock buckle 6 include a curved hook-shaped lock buckle, a U-shaped lock buckle, or the like.

Figure 5:
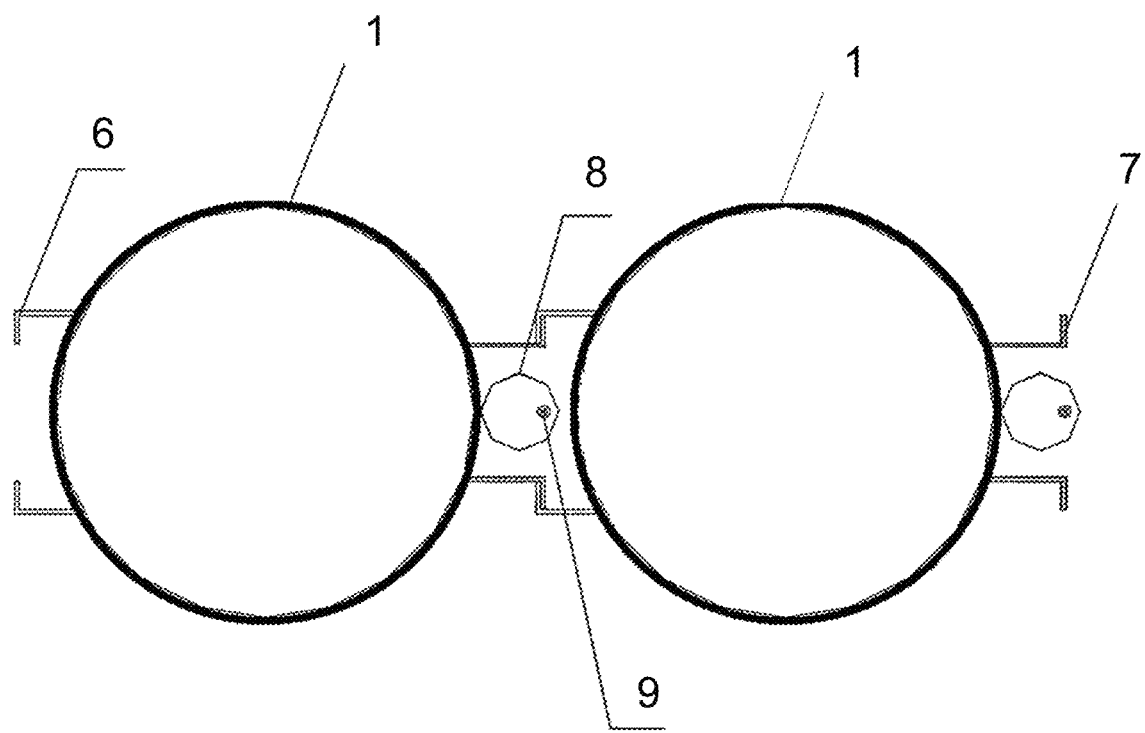
FIG. 5 is a front view illustrating a locked connection between a previous pipe-roofing steel pipe and a next pipe-roofing steel pipe according to some embodiments of the present disclosure.

FIG. 5 is a front view illustrating a locked connection between a previous pipe-roofing steel pipe and a next pipe-roofing steel pipe according to some embodiments of the present disclosure. Referring to FIG. 5, the male lock buckle 7 includes two outwardly bent L-shaped steel plates, and the female lock buckle 6 includes two inwardly bent L-shaped steel plates. The outwardly bent L-shaped steel plates and the inwardly bent L-shaped steel plates are designed with matching dimensions, thereby enabling adjacent pipe-roofing steel pipes 1 to be connected via the male lock buckle 7 and the female lock buckle 6.

In some embodiments of the present disclosure, by setting the male lock buckle 7 and the female lock buckle 6 as matching L-shaped steel plates, a manufacturing cost of the lock buckles can be reduced while ensuring a connection strength of adjacent pipe-roofing steel pipes 1.

Operation 2, fixing a pipe-roofing drilling machine 20 at a first preset position, and sleeving the pipe-roofing steel pipe 1 equipped with the measurement auxiliary pipe 8, the male lock buckle 7, and the female lock buckle 6 from operation 1 onto a spiral drill rod 2 of the pipe-roofing drilling machine 20.

The pipe-roofing drilling machine 20 refers to a drilling machine apparatus for jacking the pipe-roofing steel pipe 1 in the construction direction.

Figure 1:
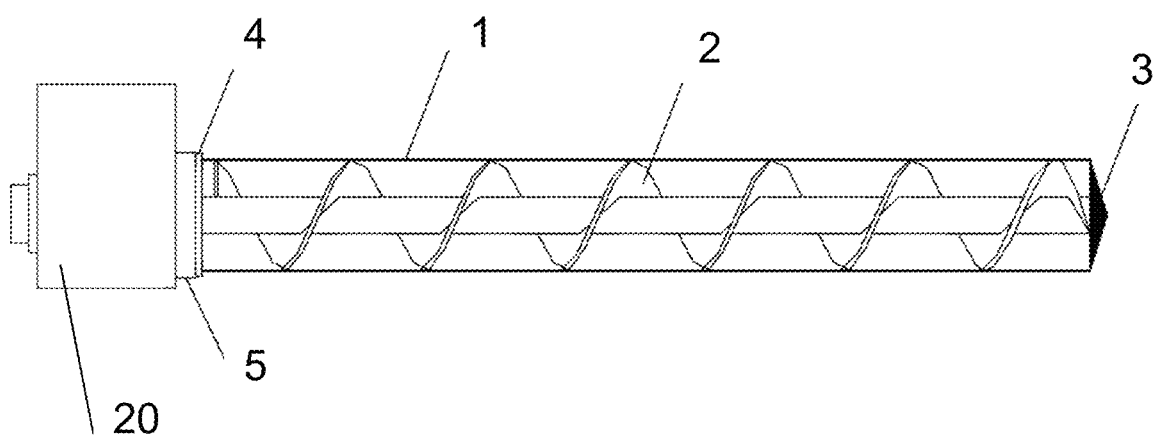
FIG. 1 is a schematic diagram of a miniature pipe-roofing jacking pipe of spiral soil-discharging according to some embodiments of the present disclosure.

FIG. 1 is a schematic diagram of a miniature pipe-roofing jacking pipe of spiral soil-discharging according to some embodiments of the present disclosure. As shown in FIG. 1, the pipe-roofing drilling machine 20 may include a housing, a drill bit 3, a jacking device 5, and a spiral drill rod 2. An exterior of the pipe-roofing drilling machine 20 may be provided with the housing, and a front end of the pipe-roofing drilling machine 20 has a circular cutout. The jacking device 5 is circular-shaped and protrudes from the circular cutout. A diameter of the jacking device 5 matches a diameter of the pipe-roofing steel pipe 1. A front end of the jacking device 5 is provided with the spiral drill rod 2 pointing in the construction direction, and an end of the spiral drill rod 2 close to the construction direction is provided with the drill bit 3. During a jacking procedure, the pipe-roofing steel pipe 1 may be sleeved on the spiral drill rod 2, and a rear end of the pipe-roofing steel pipe 1 is in contact with the front end of the jacking device 5.

The jacking device 5 refers to a device that provides a pushing force to push the pipe-roofing steel pipe 1. The jacking device 5 may include a hydraulic press, or the like.

The spiral drill rod 2 refers to a device for discharging excavated soil by the drill bit 3 from the pipe-roofing steel pipe 1.

In some embodiments, after the pipe-roofing steel pipe 1 is sleeved onto the pipe-roofing drilling machine 20, a posture of the pipe-roofing steel pipe 1 may be adjusted so that a position and a slope of the pipe-roofing steel pipe 1 meet requirements. For example, the position of the pipe-roofing steel pipe 1 may be adjusted by moving a position of the pipe-roofing drilling machine 20, and the slope of the pipe-roofing steel pipe 1 may be adjusted by changing an orientation of the pipe-roofing drilling machine 20.

In some embodiments, a thrust ring spacer 4 is provided between the jacking device 5 of the pipe-roofing drilling machine 20 and the pipe-roofing steel pipe 1.

The thrust ring spacer 4 refers to a cushioning component that protects an end face of the pipe-roofing steel pipe 1. The thrust ring spacer 4 may distribute the pushing force of the jacking device 5 evenly across the end face of the pipe-roofing steel pipe 1, thereby preventing a damage to the end face due to an uneven force distribution.

In some embodiments, a shape of the thrust ring spacer 4 may be circular, and a material of the thrust ring spacer 4 may be cast iron or steel. A dimension of the thrust ring spacer 4 matches a dimension of the pipe-roofing steel pipe 1 and a dimension of the jacking device 5.

In some embodiments, the front end of the jacking device 5 may be fitted with the thrust ring spacer 4, i.e., an end of the thrust ring spacer 4 is in contact with the jacking device 5, and another end of the thrust ring spacer 4 is in contact with the rear end of the pipe-roofing steel pipe 1.

In some embodiments of the present disclosure, by setting the thrust ring spacer 4 between the jacking device 5 and the pipe-roofing steel pipe 1, it is possible to ensure a balanced force distribution on the end face of the pipe-roofing steel pipe 1 during jacking, and at the same time avoid direct friction and impact between the jacking device and the pipe-roofing steel pipe, thereby extending a service life of the pipe-roofing steel pipe 1.

Operation 3, after the pipe-roofing steel pipe 1 is installed, fixing a measurement plate 10 onto the housing of the pipe-roofing drilling machine 20, and aligning a center point of the measurement plate 10 with the beam emitted by the laser pen 9.

The measurement plate 10 refers to a planar plate that receives the beam of the laser pen 9. The measurement plate 10 is configured to measure a deviation of the beam of the laser pen 9.

In some embodiments, as shown in FIG. 3 and FIG. 4, one measurement plate 10 is installed on the housing of the pipe-roofing drilling machine when jacking a first pipe-roofing steel pipe 1. In other embodiments, as shown in FIG. 6, when jacking a next pipe-roofing steel pipe 1, two measurement plates 10 may be installed on the pipe-roofing drilling machine housing, and the two measurement plates 10 may be located on a left side and a right side of the housing of the pipe-roofing drilling machine, respectively, so that not only a deviation of the next pipe-roofing steel pipe 1 to be jacked up is measured in real-time, but also a deviation of the previous pipe-roofing steel pipe 1 that has been jacked is monitored in real-time.

Figure 7:
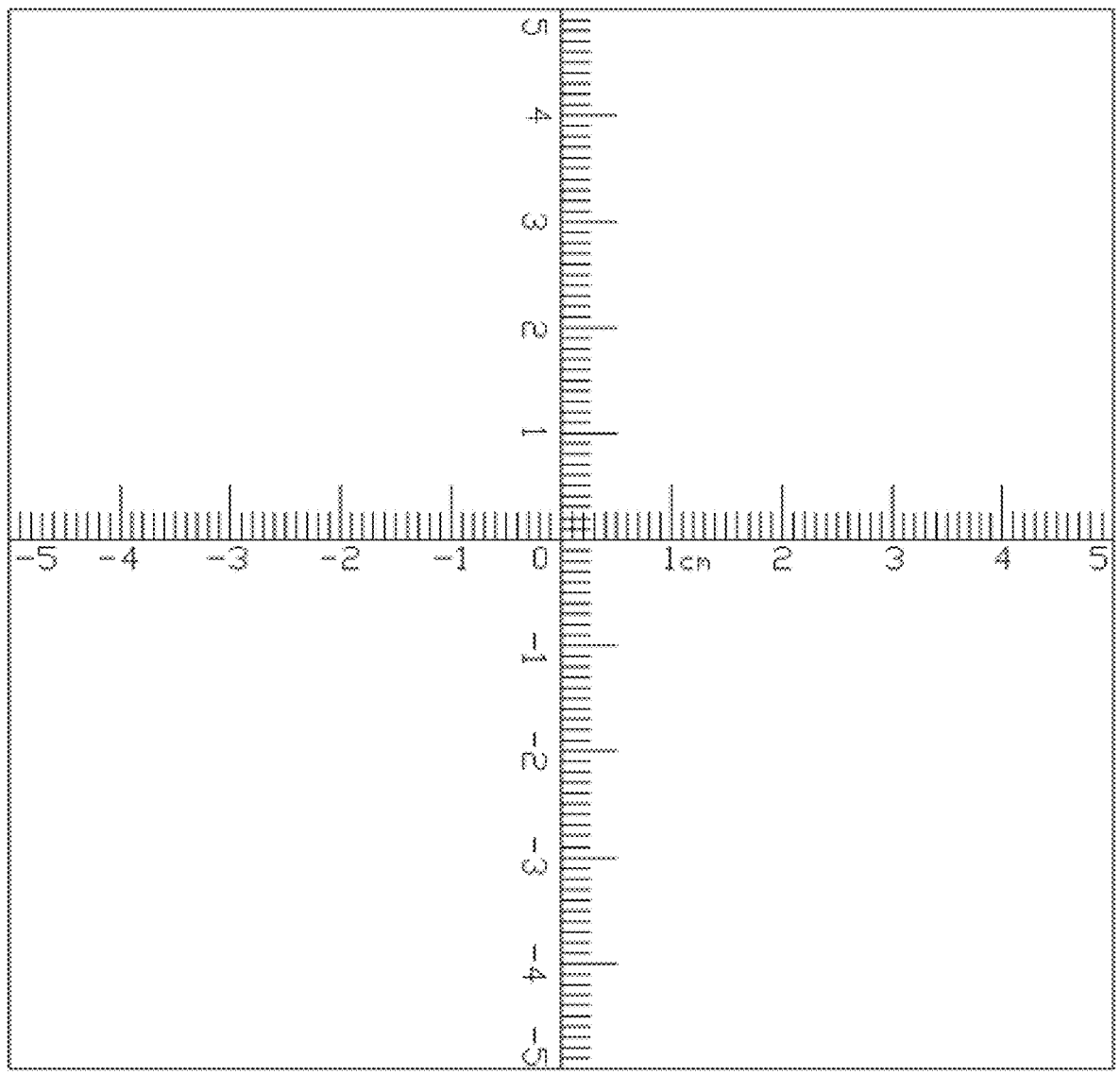
FIG. 7 is a schematic diagram of a measurement plate according to some embodiments of the present disclosure.

FIG. 7 is a schematic diagram of a measurement plate according to some embodiments of the present disclosure. In some embodiments, the measurement plate 10 is configured as a square measurement plate with a cross scale, as shown in FIG. 7. The measurement plate 10 may also be configured as other shapes and patterns, which may be determined according to actual application scenarios and needs.

Operation 4, during a jacking procedure of the pipe-roofing steel pipe 1, observing a change of a position of the beam on the measurement plate 10 to monitor a deviation of a drill bit 3 of the pipe-roofing drilling machine 20 and the pipe-roofing steel pipe 1 in real-time.

In some embodiments, an observer may determine the deviation of the drill bit 3 and the pipe-roofing steel pipe 1 by analyzing a direction and a magnitude of the change of position of the beam on the measuring plate 10. This approach eliminates a need for an auxiliary camera device or other measuring instruments, allowing an operator to intuitively observe the deviation of the pipe during the jacking procedure.

Operation 5, after completing the jacking procedure of the previous pipe-roofing steel pipe 1, moving the pipe-roofing drilling machine 20 to a second preset position for the next pipe-roofing steel pipe 1, and repeating operation 2; installing two measurement plates 10 on two sides of a main body of the pipe-roof drilling machine 20, centered on a beam on the previous pipe-roofing steel pipe 1 and a beam on the next pipe-roofing steel pipe 1, such that the beam on the previous pipe-roofing steel pipe 1 and the beam on the next pipe-roofing steel pipe 1 are directed toward center points of the two measurement plates 10 respectively. Thus, during the jacking procedure of the next pipe-roofing steel pipe 1, a deviation of the next pipe-roofing steel pipe 1 is measured in real-time, and a deviation of the previous pipe-roofing steel pipe 1 that has been jacked is monitored simultaneously. For example, initially, the beam on the next pipe-roofing steel pipe 1 is directed toward the center point of the measurement plate 10 corresponding to the next pipe-roofing steel pipe 1. When the next pipe-roofing steel pipe 1 is jacked in, if the beam shifts to a right side from the center point of the measurement plate 10, it indicates that a front end of the next pipe-roofing steel pipe 1 has deviated from its original direction during the jacking procedure, which results in a right-ward displacement. In this case, the deviation of the next pipe-roofing steel pipe 1 may be determined by a jacked length of the next pipe-roofing steel pipe 1, a deviation direction and a deviation distance of the laser point using techniques such as Pythagorean theorem, or the like. After determining the deviation, the pipe-roofing steel pipe 1 may be adjusted in time to ensure that the jacking direction and the position of the pipe-roofing steel pipe 1 are accurate.

FIG. 5 is a front view illustrating a locked connection between a previous pipe-roofing steel pipe and a next pipe-roofing steel pipe according to some embodiments of the present disclosure. As shown in FIG. 5, the next pipe-roofing steel pipe refers to a pipe-roofing steel pipe 1 sleeved onto the pipe-roofing drilling machine 20, i.e., the pipe-roofing steel pipe 1 located on the right side in FIG. 5, and the previous pipe-roofing steel pipe refers to a pipe-roofing steel pipe 1 that has been jacked, i.e., the pipe-roofing steel pipe 1 located on the left side in FIG. 5.

FIG. 6 is a top view illustrating the monitoring and measurement of a previous pipe-roofing steel pipe and a next pipe-roofing steel pipe according to some embodiments of the present disclosure. As shown in FIG. 6, when the pipe-roofing drilling machine 20 jacks a next pipe-roofing steel pipe 1, two measurement plates 10 may be installed on a housing of the pipe-roofing drilling machine, and the two measurement plates 10 may be located on a left side and a right side of the housing of the pipe-roofing drilling machine to simultaneously measure a deviation of a previous jacked pipe-roofing steel pipe 1 and a deviation of a next pipe-roofing steel pipe 1 to be jacked.

Operation 6, repeating operation 5 until a last pipe-roofing steel pipe 1 is fully jacked.

In some embodiments of the present disclosure, by welding the measurement auxiliary pipe 7 on the outer wall of the pipe-roofing steel pipe 1, the issue of being unable to perform real-time measurements from the inside of the pipe in the construction process of the spiral soil-discharging micro pipe-roofing steel pipe is solved. Moreover, the male lock buckle and the female lock buckle of the pipe-roofing steel pipe are symmetrically welded with respect to the axis formed by the line connecting the center of the circle of the measurement auxiliary pipe and the center of the circle of the pipe-roofing steel pipe, thereby facilitating easy fabrication and installation, reducing costs, and not interfering with the normal jacking of the pipe-roofing steel pipe or the connection between adjacent pipe-roofing steel pipes. In addition, two measurement plates 10 are installed on the housing of the pipe-roofing drilling machine, allowing not only real-time measurement of the deviation of the pipe-roofing steel pipe (i.e., the next pipe-roofing steel pipe) that is currently jacking but also real-time monitoring of the deviation of the previous pipe-roofing steel pipe that has been jacked.

For ease of illustration, embodiments use spatially relative terms such as "top", "bottom", "left", "right", and other spatially relative terms to illustrate the relationship of one element or feature illustrated in the drawings relative to another element or feature. It should be noted that the spatial terms are intended to encompass different orientations of the device in use or operation, in addition to the orientations illustrated in the drawings. For example, if the device in the drawings is inverted, elements recited as being located "under" other elements or features may be positioned "above" the other elements or features. Thus, the exemplary term "under" may encompass both upper and lower orientations. The device may be positioned in other ways (e.g., rotated 90 degrees or located in another orientation), and the spatial relative descriptions used here may be interpreted accordingly.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by +20%.

Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for real-time deviation monitoring of miniature pipe-roofing jacking pipes of spiral soil-discharging, comprising:

operation 1: welding a measurement auxiliary pipe to an outer wall of a pipe-roofing steel pipe, such that a central axis of the measurement auxiliary pipe is parallel to a central axis of the pipe-roofing steel pipe, wherein a laser pen is installed inside a front end of the measurement auxiliary pipe, a beam emitted by the laser pen is parallel to an axial direction of the measurement auxiliary pipe, and the beam propagates from the front end of the measurement auxiliary pipe to a rear end of the measurement auxiliary pipe along an interior of the measurement auxiliary pipe;

after the measurement auxiliary pipe is installed, a male lock buckle and a female lock buckle of the pipe-roofing steel pipe are symmetrically welded with respect to an axis formed by a line connecting a center of the measurement auxiliary pipe and a center of the pipe-roofing steel pipe, such that the male lock buckle and the female lock buckle form an integrated structure with the pipe-roofing steel pipe;

operation 2: fixing a pipe-roofing drilling machine at a first preset position, and sleeving the pipe-roofing steel pipe equipped with the measurement auxiliary pipe, the male lock buckle, and female lock buckle from operation 1 onto a spiral drill rod of the pipe-roofing drilling machine;

operation 3: after the pipe-roofing steel pipe is installed, fixing a measurement plate onto a housing of the pipe-roofing drilling machine, and aligning a center point of the measurement plate with the beam emitted by the laser pen;

operation 4: during a jacking procedure of the pipe-roofing steel pipe, observing a change of a position of the beam on the measurement plate to monitor a deviation of a drill bit of the pipe-roofing drilling machine and the pipe-roofing steel pipe in real-time;

operation 5: after completing the jacking procedure of a previous pipe-roofing steel pipe, moving the pipe-roofing drilling machine to a second preset position for a next pipe-roofing steel pipe, and repeating operation 2; installing two measurement plates on two sides of a main body of the pipe-roofing drilling machine, centered on a beam on the previous pipe-roofing steel pipe and a beam on the next pipe-roofing steel pipe, respectively, such that the beam on the previous pipe-roofing steel pipe and the beam on the next pipe-roofing steel pipe are directed toward center points of the two measurement plates, respectively, thus during the jacking procedure of the next pipe-roofing steel pipe, a deviation of the next pipe-roofing steel pipe is measured in real-time, and a deviation of the previous pipe-roofing steel pipe that has been jacked is monitored simultaneously;

operation 6: repeating operation 5 until a last pipe-roofing steel pipe is fully jacked.

2. The method of claim 1, wherein the measurement auxiliary pipe is a steel pipe.

3. The method of claim 1, wherein a diameter of the measurement auxiliary pipe is in a range of 4 cm-8 cm.

4. The method of claim 1, wherein the front end of the measurement auxiliary pipe is shaped into a conical head.

5. The method of claim 1, wherein the male lock buckle includes two outwardly bent L-shaped steel plates, and the female lock buckle includes two inwardly bent L-shaped steel plates.

6. The method of claim 1, wherein in operation 2, a posture of the pipe-roofing steel pipe is adjusted to ensure that a position and a slope of the pipe-roofing steel pipe meet a requirement, and a thrust ring spacer is installed between a jacking device of the pipe-roofing drilling machine and the pipe-roofing steel pipe.

* * * * *